(12) United States Patent
Boerschinger et al.

(10) Patent No.: US 10,318,562 B2
(45) Date of Patent: Jun. 11, 2019

(54) TRIGGERING APPLICATION INFORMATION

(71) Applicant: Google LLC, Mountain View, CA (US)

(72) Inventors: Benjamin Boerschinger, Zurich (CH); Douglas A. Aberdeen, Adliswil (CH); Andreas Christian Weissl, Zurich (CH); Jiri Isa, Langnau am Albis (CH)

(73) Assignee: Google LLC, Mountain View, CA (US)

( * ) Notice: Subject to any disclaimer, the term of this patent is extended or adjusted under 35 U.S.C. 154(b) by 249 days.

(21) Appl. No.: 15/221,329

(22) Filed: Jul. 27, 2016

(65) Prior Publication Data

US 2018/0032521 A1    Feb. 1, 2018

(51) Int. Cl.
*G06F 17/30* (2006.01)
*G06F 16/31* (2019.01)

(52) U.S. Cl.
CPC .................. *G06F 16/313* (2019.01)

(58) Field of Classification Search
CPC .... G06F 17/30616; G06F 17/00; G06F 17/30; G06F 16/313
USPC ................................................. 707/600–899
See application file for complete search history.

(56) References Cited

U.S. PATENT DOCUMENTS

| | | |
|---|---|---|
| 8,150,835 B2 | 4/2012 | Boldyrev et al. |
| 8,209,360 B2 | 6/2012 | Tomaszewski |
| 8,825,634 B2 | 9/2014 | Brodsky et al. |
| 9,223,590 B2 | 12/2015 | Moore et al. |
| 2004/0002988 A1 | 1/2004 | Seshadri et al. |
| 2009/0313279 A1 | 12/2009 | Tomaszewski |
| 2010/0293174 A1 | 11/2010 | Bennet et al. |
| 2011/0047161 A1 | 2/2011 | Myaeng et al. |
| 2011/0078166 A1 | 3/2011 | Oliver et al. |
| 2013/0325892 A1 | 12/2013 | Edwards et al. |
| 2014/0310283 A1 | 10/2014 | Laligand et al. |
| 2015/0040063 A1 | 2/2015 | Tong |
| 2015/0317679 A1 | 11/2015 | Koningstein et al. |

(Continued)

FOREIGN PATENT DOCUMENTS

WO    WO 2015-175384    11/2015

OTHER PUBLICATIONS

International Search Report and Written Opinion of the International Application No. PCT.US2017/033088, dated Aug. 28, 2017, 12 pages.

*Primary Examiner* — Isaac M Woo
(74) *Attorney, Agent, or Firm* — Fish & Richardson P.C.

(57) ABSTRACT

Methods, systems, and apparatus include computer programs encoded on a computer-readable storage medium, including a system for providing content. A stored query and a set of features of the stored query are accessed. The set of features of the stored query specifies a main query topic and at least one query subtopic. A hierarchical application classification for a particular application is accessed that specifies at least a main application category and an application sub-category for the particular application. A level of similarity is determined between the set of features of the stored query and the hierarchical application classification. A determination is made that the particular application is relevant to the stored query based on the level of similarity meeting a specified threshold. The stored query is indexed as a query that triggers presentation of information related to the particular application when the stored query is received.

17 Claims, 4 Drawing Sheets

(56) References Cited

U.S. PATENT DOCUMENTS

2016/0110230 A1    4/2016  Moore et al.
2016/0147765 A1*  5/2016  Glover ..................... G06F 8/00
                                                                             707/723

* cited by examiner

TRIGGERING APPLICATION INFORMATION

BACKGROUND

This specification relates to data processing and triggering presentation of application information.

The Internet provides access to a wide variety of resources. For example, video and/or audio files, as well as webpages for particular subjects or particular news articles, are accessible over the Internet. Access to these resources presents opportunities for third-party content to be provided with the resources. For example, a webpage can include slots in which content can be presented.

SUMMARY

In general, one innovative aspect of the subject matter described in this specification can be implemented in systems that include one or more processing devices and one or more storage devices. The storage devices store instructions that, when executed by the one or more processing devices, cause the one or more processing devices to perform operations including accessing, by one or more servers and from a memory device, a stored query and a set of features of the stored query, wherein the set of features of the stored query specifies a main query topic and at least one query subtopic for the stored query; accessing, by the one or more servers and from a memory device, a hierarchical application classification for a particular application, wherein the hierarchical application classification specifies at least a main application category and an application sub-category for the particular application; determining, by the one or more servers, a level of similarity between the set of features of the stored query and the hierarchical application classification for the particular application; determining, by the one or more servers, that the particular application is relevant to the stored query based on the level of similarity meeting a specified threshold; and indexing, by the one or servers, the stored query as a query that triggers presentation of information related to the particular application when the stored query is received from a client device.

These and other implementations can each optionally include one or more of the following features. The operations can further include: receiving, from a client device, a submitted query; determining that the particular application is relevant to the submitted query; and providing, to the client device responsive to the submitted query, data that present, within a user interface presented at the client device, information about the particular application. Determining that the particular application is relevant to the submitted query can include determining that the submitted query matches the stored query in the index. The operations can further include: receiving, from a client device, a submitted query; obtaining, for the submitted query, a set of features of the submitted query that specifies at least a main topic and a subtopic of the submitted query; identifying candidate applications having hierarchical application classifications that include the main topic and the subtopic; and providing, to the client device responsive to the submitted query, data that present, within a user interface presented at the client device, information about at least one of the candidate applications. The operations can further include identifying, from among the identified candidate applications, a given application having a highest matching score relative to the submitted query, wherein providing data that present information about at least one of the candidate applications comprises providing data that present, within the user interface presented at the client device, information identifying the given application and an interactive user interface element that enables the given application to be downloaded from an application server. The operations can further include: generating the set of features of the stored query, including: identifying, for the stored query, a set of salient terms from search results that are obtained using the stored query; parsing the stored query into a set of unigrams; and identifying, as the set of features for the stored query, a set of topics corresponding to the stored query based on the set of salient terms and the unigrams.

Particular implementations may realize none, one or more of the following advantages. Categories of applications (or "apps") can have application-related content that is selected based on query-application indexes independent of the words (e.g., keywords) matched by a content request (e.g., a query). The application-related content can be selected based on a query matching a category (or cluster) of applications (e.g., games) that are provided through an application-downloading portal (e.g., an app store) and are related to a topic of the query. Query-to-application indexing can be used to reduce rates of irrelevant content selection associated with applications having application titles that may be misconstrued by keyword matching systems. The amount of processing capabilities, time, and/or bandwidth consumption required for a user to be presented with information about a target application (e.g., an app that the user is searching for) can be reduced. The query-to-application indexing can reduce the amount of time and/or query-time processing required to identify applications that correspond to the query.

In general, another innovative aspect of the subject matter described in this specification can be implemented in methods that include: accessing, by one or more servers and from a memory device, a stored query and a set of features of the stored query, wherein the set of features of the stored query specifies a main query topic and at least one query subtopic for the stored query; accessing, by the one or more servers and from a memory device, a hierarchical application classification for a particular application, wherein the hierarchical application classification specifies at least a main application category and an application sub-category for the particular application; determining, by the one or more servers, a level of similarity between the set of features of the stored query and the hierarchical application classification for the particular application; determining, by the one or more servers, that the particular application is relevant to the stored query based on the level of similarity meeting a specified threshold; and indexing, by the one or servers, the stored query as a query that triggers presentation of information related to the particular application when the stored query is received from a client device.

These and other implementations can each optionally include one or more of the following features. The method can further include: receiving, from a client device, a submitted query; determining that the particular application is relevant to the submitted query; and providing, to the client device responsive to the submitted query, data that present, within a user interface presented at the client device, information about the particular application. Determining that the particular application is relevant to the submitted query can include determining that the submitted query matches the stored query in the index. The method can further include: receiving, from a client device, a submitted query; obtaining, for the submitted query, a set of features of the submitted query that specifies at least a main topic and a subtopic of the submitted query; identifying candidate applications having hierarchical application classifications that include the main topic and the subtopic; and providing, to the client device responsive to the submitted query, data that present, within a user interface presented at the client device, information about at least one of the candidate applications. The method can further include identifying, from among the identified candidate applications, a given application having a highest matching score relative to the submitted query, wherein providing data that present information about at least one of the candidate applications comprises providing data that present, within the user interface presented at the client device, information identifying the given application and an interactive user interface element that enables the given application to be downloaded from an application server. The method can further include: generating the set of features of the stored query, including: identifying, for the stored query, a set of salient terms from search results that are obtained using the stored query; parsing the stored query into a set of unigrams; and identifying, as the set of features for the stored query, a set of topics corresponding to the stored query based on the set of salient terms and the unigrams. The method can further include clustering multiple different applications into an application cluster based on the hierarchical application classifications of the multiple different applications, wherein the application cluster has a representative hierarchical application classification; receiving, from a client device, a submitted query; obtaining a set of features of the submitted query; mapping the set of features of the submitted query to a corresponding hierarchical application classification; determining that the corresponding hierarchical application classification has at least a specified level of similarity to the representative hierarchical application classification of the cluster; and in response to the corresponding hierarchical application classification having at least a specified level of similarity to the representative hierarchical application classification of the cluster, providing, to the client device responsive to the submitted query, data that present, within a user interface presented at the client device, information about at least some of the applications in the application cluster.

In general, another innovative aspect of the subject matter described in this specification can be implemented a non-transitory computer storage medium encoded with a computer program. The program can include instructions that when executed by a distributed computing system cause the distributed computing system to perform operations including accessing, by one or more servers and from a memory device, a stored query and a set of features of the stored query, wherein the set of features of the stored query specifies a main query topic and at least one query subtopic for the stored query; accessing, by the one or more servers and from a memory device, a hierarchical application classification for a particular application, wherein the hierarchical application classification specifies at least a main application category and an application sub-category for the particular application; determining, by the one or more servers, a level of similarity between the set of features of the stored query and the hierarchical application classification for the particular application; determining, by the one or more servers, that the particular application is relevant to the stored query based on the level of similarity meeting a specified threshold; and indexing, by the one or servers, the stored query as a query that triggers presentation of information related to the particular application when the stored query is received from a client device.

These and other implementations can each optionally include one or more of the following features. The operations can further include: receiving, from a client device, a submitted query; determining that the particular application is relevant to the submitted query; and providing, to the client device responsive to the submitted query, data that present, within a user interface presented at the client device, information about the particular application. Determining that the particular application is relevant to the submitted query can include determining that the submitted query matches the stored query in the index. The operations can further include: receiving, from a client device, a submitted query; obtaining, for the submitted query, a set of features of the submitted query that specifies at least a main topic and a subtopic of the submitted query; identifying candidate applications having hierarchical application classifications that include the main topic and the subtopic; and providing, to the client device responsive to the submitted query, data that present, within a user interface presented at the client device, information about at least one of the candidate applications. The operations can further include identifying, from among the identified candidate applications, a given application having a highest matching score relative to the submitted query, wherein providing data that present information about at least one of the candidate applications comprises providing data that present, within the user interface presented at the client device, information identifying the given application and an interactive user interface element that enables the given application to be downloaded from an application server. The operations can further include: generating the set of features of the stored query, including: identifying, for the stored query, a set of salient terms from search results that are obtained using the stored query; parsing the stored query into a set of unigrams; and identifying, as the set of features for the stored query, a set of topics corresponding to the stored query based on the set of salient terms and the unigrams. The operations can further include clustering multiple different applications into an application cluster based on the hierarchical application classifications of the multiple different applications, wherein the application cluster has a representative hierarchical application classification; receiving, from a client device, a submitted query; obtaining a set of features of the submitted query; mapping the set of features of the submitted query to a corresponding hierarchical application classification; determining that the corresponding hierarchical application classification has at least a specified level of similarity to the representative hierarchical application classification of the cluster; and in response to the corresponding hierarchical application classification having at least a specified level of similarity to the representative hierarchical application classification of the cluster, providing, to the client device responsive to the submitted query, data that present, within a user interface presented at the client device, information about at least some of the applications in the application cluster.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
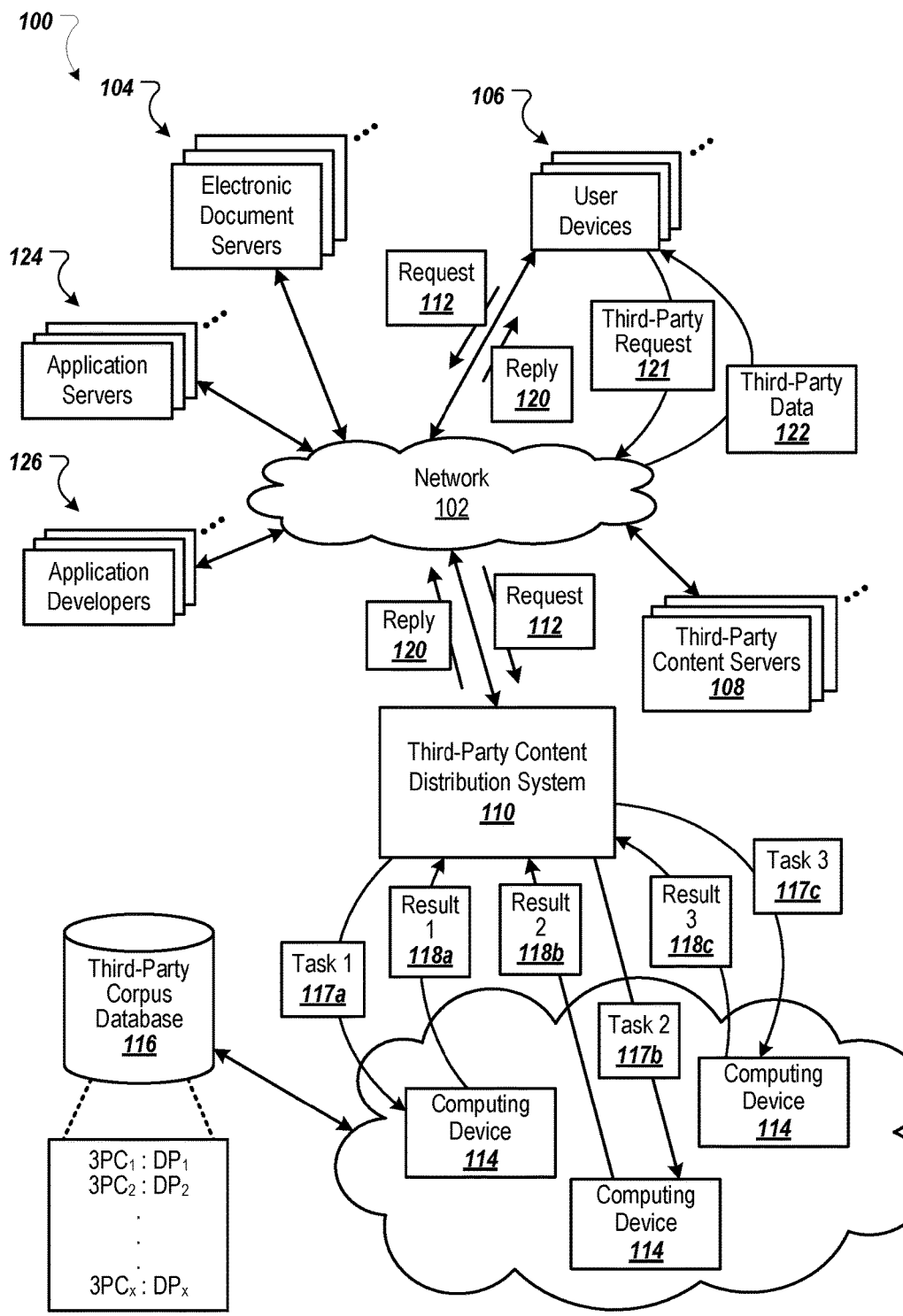
FIG. 1 is a block diagram of an example environment in which third-party content is distributed for presentation with electronic documents.

Systems, methods, and computer program products are described for indexing queries that trigger presentation of application-related information. For example, the application-related information can be presented to a user and can include information that describes the functionality of an application, a category of the application, and/or a title of the application). The information can apply, for example, to applications that are available for downloading to and/or installation on a client device. In some implementations, each application (or "app") can be indexed to known queries that are used to specifically request information about the application, such as to create a query-to-application index. The queries can originate, for example, from app-related sites (e.g., application stores) and general search sites. The created query-to-application index can support real-time serving of content (e.g., advertisements for apps associated with a received query). For example, the query-to-application index can map specific queries to the applications. Also, clustering techniques can be used to map queries to categories of applications, e.g., based on hierarchical classifications that are shared between queries and applications.

Multiple different ways can be used to identify applications that are to be presented and/or downloaded. One way can involve, for example, the indexing of queries to applications, as described previously. The indexing can be done offline, requiring that many instances of the query have been previously received and analyzed, e.g., in order to determine what is relevant. Analysis can occur, for example, on search results that have surfaced and with which the user has interacted with, e.g., to determine salient terms for the query. Salient terms can include, for example, important topic-related terms or phrases in a document (e.g., a web page) and can exclude non-topical words (e.g., articles and other non-nouns) that typically are not searched on. The salient terms can then be compared to salient terms associated with the app (e.g., including terms identified from the application's description, and queries that were submitted and led to downloads of the app) to determine similarities between queries and apps.

Another way of identifying applications, for example, can include the use of query-time matching of hierarchical classifications of the query-to-hierarchical classifications of individual applications in order to determine similarity. For example, applications can be identified based on hierarchical classifications that are shared between queries and applications. A particular example would be providing information for one or more applications that are classified as /games→/puzzles→/some_example_puzzle_type when an incoming query is classified to the same level of the hierarchical classification of the query.

Still another way of identifying applications, for example, can include the clustering of applications to classifications in order to identify a set of relevant applications. This approach again uses query-time analysis of query as described above, and can further match the classification to a cluster of applications that have been classified to that same hierarchical classification. The clustering can occur at various levels so that the applications in a given cluster can be identified/returned in real time when query is received. Other ways of identifying applications are possible.

In some implementations, determining matches between queries and applications can include analyzing classes of features that can be transposed or shared between the query classification space and the application classification space. For example, the features that are analyzed can be semantic, such as features that not only capture an intent of the query but also a purpose of the application. This can be done, for example, without relying solely on lexical comparisons of the query text and application name, even though lexical comparisons can be a useful feature for detecting navigational matches. A match between a query and an app is considered to be navigational when the query is determined to be an attempt by the user to locate a particular application. This type of match can be deemed to exist when terms of the query are sufficiently similar to (e.g., a near exact match with) the title of the particular application and/or when historical query logs reveal that at least a threshold portion of users who submit a given query have ultimately requested information about and/or downloaded the particular application. In a keywordless, query-to-application mapping approach, different types of features can be the focus of matching rather than keyword matching techniques.

Salient terms that are shared between a query and an application can be used as a first type of feature. For example, salient terms can be words or bigrams (or other n-grams) that are the important terms or phrases in a document such as a web page, such as excluding non-topical words (e.g., articles and other non-nouns) that typically are not searched on. On the query side, for example, salient terms can be extracted from search results that are returned responsive to a received query, such as by analyzing historical information including analyzing queries that have been entered by users and the resulting query results that were produced in response to the queries. On the application side, salient terms can be extracted from web pages associated with an application, or extracted from a description of the application that is found in an application store or other application-related page.

Another type of feature, e.g., associated with topics and subtopics, can be determined using information from indexing structures such as trees, networks, and other structures used in indexing and relating terms. For example, the indexing structures can include identifiers associated with topic clusters over web documents derived through a semi-supervised clustering process. On the query side, input received from users can provide query-to-structure topic classifiers. On the application side, the application description can be used as a source of text from which to identify topics that can be used to classify the application. In some implementations, app-side semantic signals can be determined by automatically running the app in a sandboxed environment and/or interpreting the app's operating system distribution/install file directly for semantic signals.

Still another type of feature, e.g., a title-related feature, can be associated with application titles of application. For example, a set of lexical features, e.g., unigrams or other n-grams, can be extracted from both the application title and the query. Matches between the sets of lexical features can provide a measure of similarity between the query and the application.

A further type of feature includes taxonomies that represent hierarchies of application categories that can also be used for determining salient terms. For example, a taxonomy can include hierarchical relationships such as /Games→/Games/Puzzles, or /Games→/Games/Puzzle_Games/Number_Games, among other possible hierarchies. Salient terms can be determined, for example, from per-application classifications such as a combination of human-input labels, publisher-provided categories, and inferences from a model that analyzes available information about the application. On the query side, salient terms can be determined from a model that maps, for example, topics for a query to the most likely categories, or hierarchical classification, of the query, as described in more detail below.

In some implementations, each of the features on both the query side and the application side can include weights that are used for example, to compute an overall score associated with the feature and either the query or application. In some implementations, the overall score relating a query to an application can be computed by taking an inner product between vectors of the features on the query side and vectors of the features on the application side, including multiplying each feature by its corresponding weight for that class of features (e.g., salient terms, topics/subtopics, titles, and application categories). The inner product can be simplified, for example, by counting an overlap between sets of features on the query side and application side. Generally, the relatedness (e.g., similarity) between the query and applications increases as the overlap increases.

Different ways can be used to establish weights associated with each class of features. In some implementations, a ground truth set can be established for each query-application pair, e.g., to identify a relevance score. For example, human raters who are provided with a sample of query-to-application matches can rank the relevance of each query-to-application match on a scale of [−100, 100] (or some other scale). In some implementations, many thousands of such human-rated query-to-application relevance scores can be used to train a linear regression model (e.g., using non-linear regression or classification models) over feature classes to effectively weight the usefulness of each feature in determining similarities between queries and applications.

As increases occur in the number of applications and historical queries, increases also occur in the processing requirements and/or amount of time required to identify applications that are relevant to a given query. For example, the number of applications may exceed $10^8$ or more, and the number of queries may exceed $10^7$ or more. In some implementations, in order to overcome technical problems (e.g., processing requirements/processing time/storage requirements) associated with determining relevance scores associated with the ever increasing number of applications and queries, the number of relevance scores that are saved can be limited to N queries that have the highest inner product between the query and application features.

FIG. 1 is a block diagram of an example environment 100 in which third-party content is distributed for presentation with electronic documents. The example environment 100 includes a network 102, such as a local area network (LAN), a wide area network (WAN), the Internet, or a combination thereof. The network 102 connects electronic document servers 104, user devices 106, third-party content servers 108, and a third-party content distribution system 110 (also referred to as a content distribution system). The example environment 100 may include many different electronic document servers 104, user devices 106, and third-party content servers 108. In some implementations, the environment 100 includes application servers 124 (e.g., app stores), e.g., that provide applications (or "apps") that are available for downloading and/or use. For example, the apps may be developed by application (or "app") developers 126.

A user device 106 is an electronic device that is capable of requesting and receiving resources (e.g., electronic documents) over the network 102. Example user devices 106 include personal computers, mobile communication devices, and other devices that can send and receive data over the network 102. A user device 106 typically includes a user application, such as a web browser, to facilitate the sending and receiving of data over the network 102, but native applications executed by the user device 106 can also facilitate the sending and receiving of data over the network 102.

An electronic document is data that presents a set of content at a user device 106. Examples of electronic documents include webpages, word processing documents, portable document format (PDF) documents, images, videos, search results pages, and feed sources. Native applications (e.g., "apps"), such as applications installed on mobile, tablet, or desktop computing devices are also examples of electronic documents. Electronic documents can be provided to user devices 106 by electronic document servers 104. For example, the electronic document servers 104 can include servers that host publisher websites. In this example, the user device 106 can initiate a request for a given publisher webpage, and the electronic document server 104 that hosts the given publisher webpage can respond to the request by sending machine Hyper-Text Markup Language (HTML) code that initiates presentation of the given webpage at the user device 106.

In another example, the electronic document servers 104 can include app servers from which user devices 106 can download apps. In this example, the user device 106 can download files required to install an app at the user device 106, and then execute the downloaded app locally.

Electronic documents can include a variety of content. For example, electronic document can include static content (e.g., text or other specified content) that is within the electronic document itself and/or does not change over time. Electronic documents can also include dynamic content that may change over time or on a per-request basis. For example, a publisher of a given electronic document can maintain a data source that is used to populate portions of the electronic document. In this example, the given electronic document can include a tag or script that causes the user device 106 to request content from the data source when the given electronic document is processed (e.g., rendered or executed) by a user device 106. The user device 106 integrates the content obtained from the data source into a presentation of the given electronic document to create a composite electronic document including the content obtained from the data source.

In some situations, a given electronic document can include a third-party tag or third-party script that references the third-party content distribution system 110. In these situations, the third-party tag or third-party script is executed by the user device 106 when the given electronic document is processed by the user device 106. Execution of the third-party tag or third-party script configures the user device 106 to generate a request 112 for third-party content, which is transmitted over the network 102 to the third-party content distribution system 110. For example, the third-party tag or third-party script can enable the user device 106 to generate packetized data request including a header and payload data. The request 112 can include data such as a name (or network location) of a server from which the third-party content is being requested, a name (or network location) of the requesting device (e.g., the user device 106), and/or information that the third-party content distribution system 110 can use to select third-party content provided in response to the request. The request 112 is transmitted, by the user device 106, over the network 102 (e.g., a telecommunications network) to a server of the third-party content distribution system 110.

The request 112 can include data specifying the electronic document and characteristics of locations at which third-party content can be presented. For example, data specifying a reference (e.g., URL) to an electronic document (e.g., webpage) in which the third-party content will be presented, available locations (e.g., third-party content slots) of the electronic documents that are available to present third-party content, sizes of the available locations, positions of the available locations within a presentation of the electronic document, and/or media types that are eligible for presentation in the locations can be provided to the third-party content distribution system 110. Similarly, data specifying keywords associated with the electronic document ("document keywords") or entities (e.g., people, places, or things) that are referenced by the electronic document can also be included in the request 112 (e.g., as payload data) and provided to the third-party content distribution system 110 to facilitate identification of third-party content items that are eligible for presentation with the electronic document.

Requests 112 can also include data related to other information, such as information that the user has provided, geographic information indicating a state or region from which the request was submitted, or other information that provides context for the environment in which the third-party content will be displayed (e.g., a type of device at which the third-party content will be displayed, such as a mobile device or tablet device). Data specifying characteristics of the user device 106 can also be provided in the request 112, such as information that identifies a model of the user device 106, a configuration of the user device 106, or a size (e.g., physical size or resolution) of an electronic display (e.g., touchscreen or desktop monitor) on which the electronic document is presented. Requests 112 can be transmitted, for example, over a packetized network, and the requests 112 themselves can be formatted as packetized data having a header and payload data. The header can specify a destination of the packet and the payload data can include any of the information discussed above.

The third-party content distribution system 110 selects third-party content (e.g., information about apps) that will be presented with the given electronic document in response to receiving the request 112 and/or using information included in the request 112. In some implementations, the third-party content is selected in less than a second to avoid errors that could be caused by delayed selection of the third-party content. For example, delays in providing third-party content in response to a request 112 can result in page load errors at the user device 106 or cause portions of the electronic document to remain unpopulated even after other portions of the electronic document are presented at the user device 106. Also, as the delay in providing third-party content to the user device 106 increases, it is more likely that the electronic document will no longer be presented at the user device 106 when the third-party content, thereby negatively impacting a user's experience with the electronic document. Further, delays in providing the third-party content can result in a failed delivery of the third-party content, for example, if the electronic document is no longer presented at the user device 106 when the third-party content is provided.

In some implementations, the third-party content distribution system 110 is implemented in a distributed computing system that includes, for example, a server and a set of multiple computing devices 114 that are interconnected and identify and distribute third-party content in response to requests 112. The set of multiple computing devices 114 operate together to identify a set of third-party content that are eligible to be presented in the electronic document from among a corpus of millions of available third-party content (3PC1-x). The millions of available third-party content can be indexed, for example, in a third-party corpus database 116. Each third-party content index entry can reference the corresponding third-party content and/or include distribution parameters (DP1-DPx) (e.g., selection criteria) that condition the distribution of the corresponding third-party content.

In some implementations, the distribution parameters (e.g., selection criteria) for a particular third-party content can include distribution keywords that must be matched (e.g., by electronic documents or terms specified in the request 112) in order for the third-party content to be eligible for presentation. The distribution parameters can also require that the request 112 include information specifying a particular geographic region (e.g., country or state) and/or information specifying that the request 112 originated at a particular type of user device (e.g., mobile device or tablet device) in order for the third-party content to be eligible for presentation. The distribution parameters can also specify a bid and/or budget for distributing the particular third-party content.

The identification of the eligible third-party content can be segmented into multiple tasks 117a-117c that are then assigned among computing devices within the set of multiple computing devices 114. For example, different computing devices in the set of multiple computing devices 114 can each analyze a different portion of the third-party corpus database 116 to identify various third-party content having distribution parameters that match information included in the request 112. In some implementations, each given computing device in the set of multiple computing devices 114 can analyze a different data dimension (or set of dimensions) and pass results 118a-118c of the analysis back to the third-party content distribution system 110. For example, the results 118a-118c provided by each of the computing devices in the set may identify a subset of third-party content that are eligible for distribution in response to the request and/or a subset of the third-party content that have certain distribution parameters or attributes.

The third-party content distribution system 110 aggregates the results 118a-118c received from the set of multiple computing devices 114 and uses information associated with the aggregated results to select one or more instances of third-party content that will be provided in response to the request 112. For example, the third-party content distribution system 110 can select a set of winning third-party content based on the outcome of one or more content evaluation processes, as discussed in further detail below. In turn, the third-party content distribution system 110 can generate and transmit, over the network 102, reply data 120 (e.g., digital data representing a reply) that enable the user device 106 to integrate the set of winning third-party content into the given electronic document, such that the set of winning third-party content and the content of the electronic document are presented together at a display of the user device 106.

In some implementations, the user device 106 executes instructions included in the reply data 120, which configures and enables the user device 106 to obtain the set of winning third-party content from one or more third-party content servers. For example, the instructions in the reply data 120 can include a network location (e.g., a Uniform Resource Locator (URL)) and a script that causes the user device 106 to transmit a third-party request 121 to the third-party content server 108 to obtain a given winning third-party content from the third-party content server 108. In response to the request, the third-party content server 108 will transmit, to the user device 106, third-party data 122 that causes the given winning third-party content to be incorporated into the electronic document and presented at the user device 106.

The third-party content distribution system 110 can utilize one or more evaluation processes to identify and select the set of winning third-party content for each given request (e.g., based on data corresponding to the request). In some implementations, the evaluation process is not only required to determine which third-party content to select for presentation with the electronic document, but also the type of formatting that will be dynamically (e.g., on a per-request basis) applied to the selected third-party content, and the price that will be paid for presentation of the selected third-party content when presented with the applied formatting.

In some implementations, the third-party content distribution system 110 may select winning third-party content in response to a given request from among a set of third-party content items (e.g., instances of third-party content) that have been deemed eligible to return to the user device 106 in response to that request. Eligible third-party content can be identified on a per-request basis according to various data specified in the request, or context associated with the request. For example, the request may indicate a permissible size or aspect ratio of the requested third-party content, and the third-party content distribution system 110 may filter the total set of available third-party content to a set of eligible content that satisfies the size or aspect ratio constraint, and any other applicable constraints. The evaluation process for selecting winning third-party content can then be performed only with respect to the set of eligible third-party content. In some examples, the evaluation process may involve scoring and ranking third-party content items. The winning third-party content item may be the highest-ranked item according to the scores. In some implementations, the ineligible third-party content may be excluded from the total set of available content before the content is scored and ranked. In some implementations, the ineligible third-party content may be excluded from the total set of available content after the content is scored and ranked.

Figure 2:
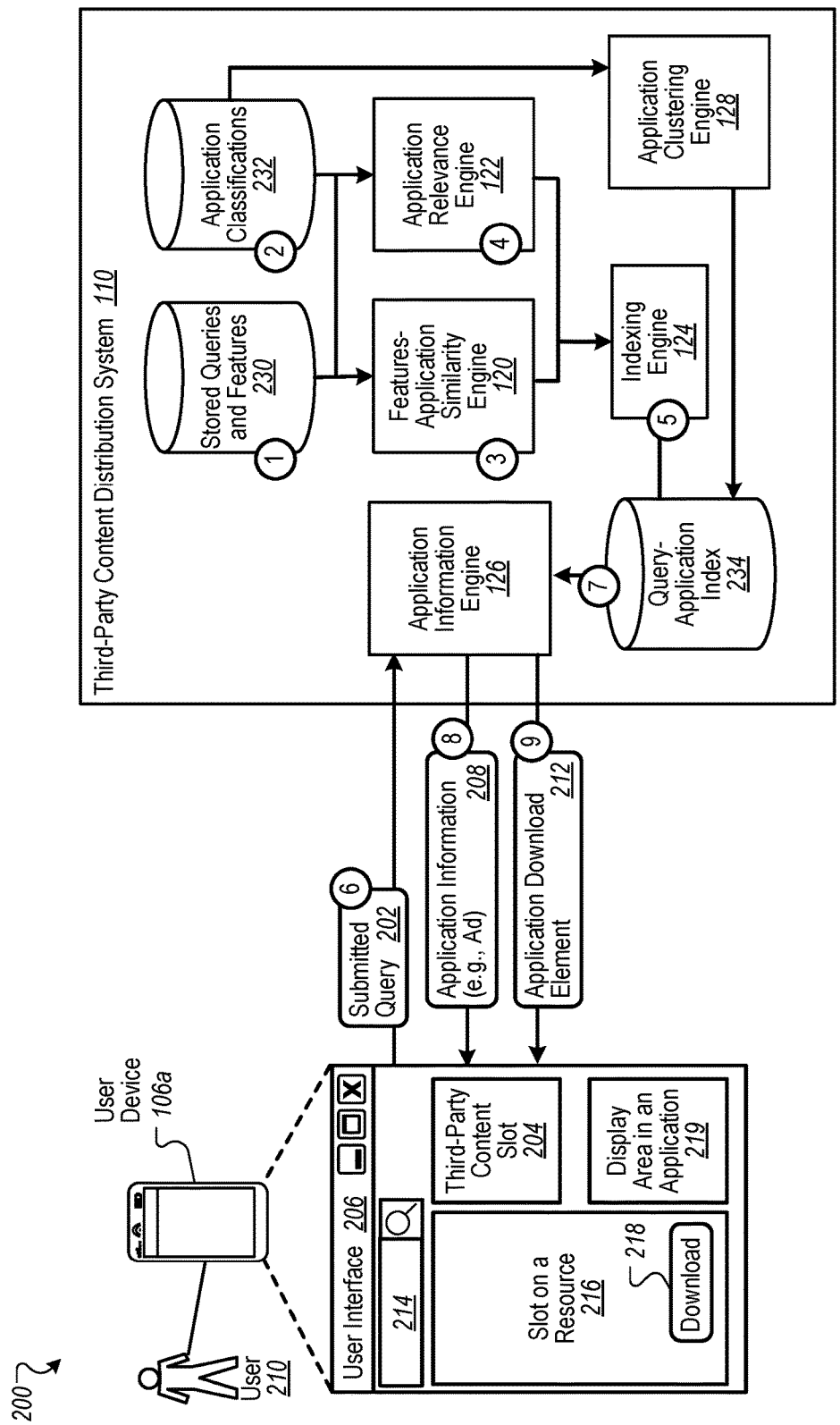
FIG. 2 shows an example system that triggers presentation of information related to applications.
Figure 3:
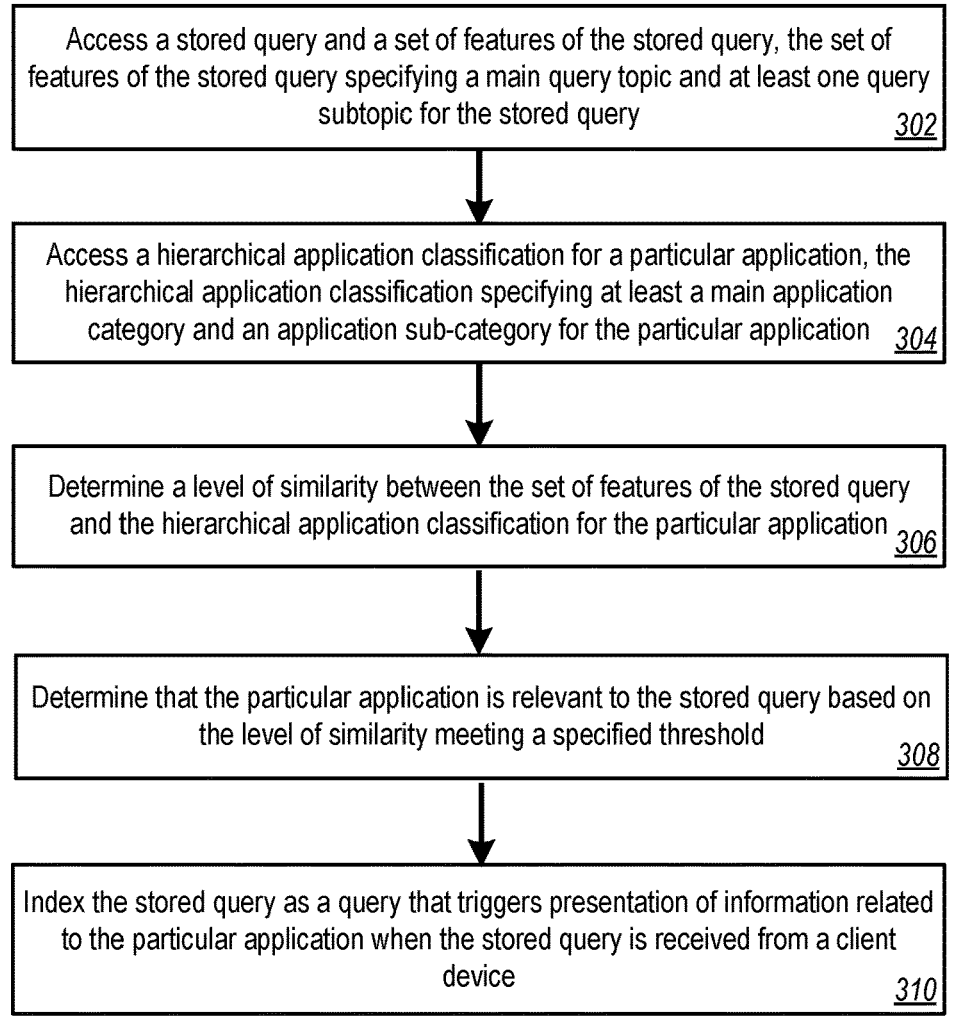
FIG. 3 is a flowchart of an example process for indexing queries that trigger presentation of information related to applications.

As described further with respect to FIGS. 2-3, the third-party content distribution system 110 may be configured to trigger presentation of information related to applications. For example, in response to receiving a submitted query, the third-party content distribution system 110 can provide application information associated with an app, such as an advertisement for the app and/or an app download element.

FIG. 2 shows an example system 200 that triggers presentation of information related to applications. As shown in FIG. 2, interactions and data are shown between the third-party content distribution system 110 and a user device 106a associated with a user 210. The third-party content distribution system 110, for example, can generate a query-application index 234 that allows identification of a particular application associated with a submitted query 202 received from the user device 106a. The submitted query 202, for example, can originate from a user interface 206 that displays information for, and facilitates user interaction with, the user 210. In response to the received submitted query 202, for example, the third-party content distribution system 110 can look up an associated application identified from the query and provide application information 208 for a particular application. In some implementations, the third-party content distribution system 110 can provide data that causes presentation of an application download element 212 with which a user 210 can interact (e.g., with a click or tap) to download the particular application.

The plural data stores included in, or used by, the third-party content distribution system 110 can be stored locally by the third-party content distribution system 110, stored somewhere else and accessible using the network 102, generated as needed from various data sources, or some combination of these. Further, some data stores described herein may include identifiers that can be used to match or access corresponding data records or other information that are stored elsewhere, e.g., locally and/or remotely.

In order to be able to trigger presentation of information related to applications, the third-party content distribution system 110 can include plural engines, some or all of which may be combined or separate, and may be co-located or distributed (e.g., connected over the network 102). A features-application similarity engine 220, for example, can determine similarities between features of stored queries and the hierarchical classification associated with applications. An application relevance engine 222, for example, can determine if the level of similarity that is determined by the features-application similarity engine 220 exceeds a threshold. If so, then the application relevance engine 222 can indicate that the relationship between the query and the application is to be stored and indexed. An indexing engine 224, for example, can create an index for the query-application pair and store the index in a query-application index 234. The query-application index 234, for example, can store, for each query-application pair, an index that enables an application to be looked up when a query is received. This is done in contrast, for example, to identifying a content item (e.g., an advertisement) based on keywords in a query that match content selection criteria in a campaign. An application information engine 226, for example, can determine that the particular application is relevant to a submitted query and provide application information to a client device that is responsive to the submitted search query. An application clustering engine 228, for example, can cluster (e.g., group) multiple different applications into an application cluster based on the hierarchical application classifications of the multiple different applications. Different types of applications can be clustered into different and/or overlapping sets of clusters. For example, applications for games and board games may be in a same cluster, while applications for tracking health, fitness and physical activity may be in a different cluster.

In some implementations, the following example stages can be used for grouping queries and pricing associated content items. At stage 1, for example, the third-party content distribution system 110 can access a stored query (e.g., "widgets game") and a set of features of the stored query. As an example, the set of features of a stored query can specify a main query topic and at least one query subtopic for the stored query. The stored query and the set of features of the stored query that have previously been stored can be accessed in a data store of stored queries and features 230. For example, the data store of stored queries and features 230 can store information about queries that have been received by the third-party content distribution system 110 and/or by other systems. There can be different classes of features, including (but not limited to) salient terms, topics/subtopics, titles, and application categories. As described above, salient terms can include important topic-related terms or phrases in a document, such as a web page, but can also apply to important topic-related terms or phrases associated with an application, such as identified from the application's description or product page. In some implementations, the analysis of unknown queries (e.g., tail queries) that have not been previously stored can be performed in real-time (e.g., at query time). For example, semantic features can be computed on the query side, and inner products using the query and an all available app inventory can be done in real-time to match a received query to relevant applications.

At stage 2, for example, the third-party content distribution system 110 can access a hierarchical application classification for a particular application (e.g., a Widgetland2017 application). The hierarchical application classification can specify at least a main application category (e.g., widget-related apps) and at least one application sub-category (e.g., educational widget-related apps) for the particular application. The hierarchical application classifications can be accessed from the data store of application classifications 232. The data store of application classifications 232, for example, can store hierarchical application classification for applications specifying, for each application, at least a main application category and at least one application sub-category for the particular application. Other intervening sub-categories can exist, meaning that multiple levels of classifications can exist. Further, a particular application can be associated with multiple sub-categories of the same category or multiple sub-sub-categories of the same sub-category.

At stage 3, for example, the features-application similarity engine 220 can determine similarities between the set of features of the stored query and the hierarchical application classification for the particular application. Determining similarities can be done, for example, by analyzing classes of features that can be transposed or shared between the query classification space and the application classification space. For example, salient terms that are in common between the stored query and the particular application can be analyzed, such as to determine a percentage of overlap of common terms or a score that indicates a number of common salient terms. Analysis can also occur on the topics and subtopics that are associated with each of the stored query and the particular application, e.g., to determine common topics and subtopics. One or more portions of the particular application's title can be compared to terms in the stored query to determine if (and a degree to which) the particular application and the stored query are title-related. Further, categories and sub-categories can be compared between the particular application and the stored query.

In some implementations, the features can be weighted for both the stored query and the particular application, e.g., to assign different weights to different types of features. As a result, salient terms may be weighted differently that each of topics/subtopics, titles, and application categories. In some implementations, the features-application similarity engine 220 can determine an overall score associated with the similarities between the set of features of the stored query and the particular application. For example, the overall score can be determined by calculating an inner product between the features on the stored query and the particular application, including optionally using the weights for each class of features. In some implementations, instead of using an inner product, the overall score can be a count of overlapping features between the stored query and the particular application.

At stage 4, for example, the application relevance engine 222 can determine that the particular application is relevant to the stored query based on the level of similarity meeting a specified threshold, meaning that the relationship between the stored query and the particular application should be stored and indexed. For example, if the overall score determined by the features-application similarity engine 220 is above a predetermined value, then the application relevance engine 222 can decide that a relationship between the stored query and the particular application is to be stored (e.g., and indexed, as in the next stage).

At stage 5, for example, the indexing engine 224 can index the stored query (e.g., "widgets game") as a query that triggers presentation of information related to the particular application (e.g., the Widgetland2017 application) when the stored query is received from a client device (e.g., user device 106). For example, the indexing engine 224 can create an index for the query-application pair (e.g., [("widgets game"), (Widgetland2017)] and store the index in the query-application index 234. The index, for example, can make it possible to identify, automatically and in real-time, the particular application when a query matching the stored query is received. In some implementations, the strength of the relationship between the query and the application can be stored as well, e.g., to be used at run-time to find a highest-ranked application matching the query. Multiple query-application pairs can be stored for the same query.

Stages 1-5, for example, can be done in background and repeated as necessary for new queries and applications that are identified and for which query-application indexing is desired. Further, Stages 1-5 can be re-run as needed to keep the query-application index 234 up-to-date. Stages 6-9 can then occur in real-time At stage 6, for example, the third-party content distribution system 110 can receive a submitted query 202 (e.g., "widgets game"), such as a search query entered in a search control 214 in the user interface 206. The submitted query 202 can instead originate from a slot in a resource 216, a third-party content slot 204, a display area 219 in an application, or some other source related to the user interface 206. In some implementations, the user interface 206 can be part of a download page for searching for and accessing various applications.

At stage 7, for example, the application information engine 226 can determine that the particular application is relevant to the submitted query. For example, the application information engine 226 can look up the received submitted query 202 (e.g., "widgets game") in the query-application index 234 to identify the application (e.g., the Widgetland2017 application) associated with the query.

At stage 8, for example, the application information engine 226 can provide application information 208 in response to the received submitted query 202. The application information 208 can include information about the application identified from the query-application index 234. For example, the information can include a link to the application, information (e.g., a product page) associated with the application, and information needed to download and/or purchase the application.

At stage 9, for example, the application information engine 226 can provide data for presenting, in the user interface 206, an application download element 212 associated with the application for which application information 208 is provided. For example, the information provided for the application download element 212 can allow the user to download the application, e.g., to the user interface 206.

FIG. 3 is a flowchart of an example process 300 for indexing queries that trigger presentation of information related to applications. In some implementations, the third-party content distribution system 110 and components that it includes can perform steps of the process 300 using one or more servers and a memory device storing instructions that are executed by one or more processors. FIGS. 1-2 are used to provide example structures for performing the steps of the process 300. For example, stages 1-5, described above with reference to FIG. 2, track to steps 302-310, respectively.

A stored query and a set of features of the stored query are accessed (302). As an example, the set of features of a stored query (e.g., "Widget Apps") can specify a main query topic (e.g., "Widgets Controls") and at least one query subtopic (e.g., "Widgets Settings") for the stored query. The third-party content distribution system 110 and/or its components can access the stored query and the set of features of the stored query that have previously been stored, such as in the data store of stored queries and features 230.

A hierarchical application classification for a particular application is accessed (304). The hierarchical application classification specifies at least a main application category (e.g., widget-related apps) and at least one application sub-category (e.g., educational widget-related apps) for the particular application (e.g., a Widgetland2017 application). The third-party content distribution system 110 and/or its components can access hierarchical application classifications from the data store of application classifications 232.

A level of similarity is determined between the set of features of the stored query and the hierarchical application classification for the particular application (306). The features-application similarity engine 220, for example, can determine similarities between features of the stored query (e.g., "Widget Apps") and the hierarchical classification associated with the Widgetland2017 application.

A determination is made that the particular application is relevant to the stored query based on the level of similarity meeting a specified threshold (308). The application relevance engine 222, for example, can determine if the level of similarity that is determined by the features-application similarity engine 220 exceeds a threshold, and if so, then the application relevance engine 222 can indicate that the relationship between the query and the application can be stored and indexed.

The stored query is indexed as a query that triggers presentation of information related to the particular application when the stored query is received from a client device (310). For example, for queries received from the user device 106, the indexing engine 224 can create an index for the query-application pair and store the index in the query-application index 234. As a result, an index can be stored that is associated, for example, with the query "Widget Apps" and the Widgetland2017 application.

In some implementations, the process 300 can further include steps for serving content in response to a received query. For example, the submitted query 202 (e.g., "Widget Apps") can be a search query entered in the search box 214 or some other request for content can be received, by the third-party content distribution system 110, from the user interface 206 associated with the user device 106a. The application information engine 226, for example, can determine that the particular application (e.g., the Widgetland2017 application) is relevant to the submitted query. In some implementations, determining that the particular application is relevant to the submitted query can include determining that the submitted query matches the stored query in the index, e.g., by locating a "Widget Apps" in the query-application index 234. Upon locating the entry, the application information engine 226, for example, can provide the application information 208 to the user device 106 that is responsive to the submitted search query. The application information 208 can be used, by the user device 106a, to present, within the user interface 206, information about the particular application. For example, the data that is provided can include one or more of: search results associated with the particular application, an advertisement related to the particular application, a specification sheet or other information associated with the particular application, or some other content associated with the particular application and relevant to the search query.

In some implementations, the process 300 can further include steps for providing information for candidate applications matching hierarchical application classifications associated with a main topic and subtopic of a received submitted query. For example, the third-party content distribution system 110 can receive a submitted query (e.g., "Widget Apps") from the user device 106a. The application information engine 226, for example, can obtain a set of features of the submitted query, the set of features specifying at least a main topic (e.g., "Widgets Controls") and a subtopic (e.g., "Widgets Settings") of the submitted query. The application information engine 226 can identify candidate applications (e.g., including Widgetland2017 and other applications) that have hierarchical application classifications that include the main topic and the subtopic. The application information engine 226 can provide data (e.g., application information 208) to the user device 106a responsive to the submitted query. The application information 208 can be used, by the user device 106a, to present, within the user interface 206, information about the candidate applications.

In some implementations, the process 300 can further include identifying, from among the identified candidate applications, a given application having a highest matching score relative to the submitted query. For example, the application information engine 226 can identify, such as in an auction, Widgetland2017 as being the candidate application that best matches the query "Widget Apps." The application information engine 226 can provide data (e.g., application information 208) about a given application to the user device 106a. The data can be used for presenting, within the user interface 206, information identifying the given application and an interactive user interface element (e.g., the download control 218) that enables the given application to be downloaded from an application server 117 (e.g., an app store).

In some implementations, the process 300 can further include steps for generating the set of features of the stored query. For example, using information from submitted queries 202 that are received over time, the application information engine 226 can identify a set of salient terms for the stored query using the search results that are obtained using the stored query. In some implementations, the stored query can be parsed into a set of unigrams (i.e., single words or terms) or other n-grams. The application information engine 226 can identify a set of topics as the set of features for the stored query. For example, the set of topics that are identified can correspond to the stored query based on the set of salient terms and the unigrams.

In some implementations, the process 300 can further include steps for creating clusters of related applications and using the clusters to respond to submitted queries. For example, the application clustering engine 228 can cluster (e.g., group) multiple different applications into an application cluster (e.g., applications related to widgets) based on the hierarchical application classifications of the multiple different applications (e.g., stored in the data store of application classifications 232). The application cluster can have a representative hierarchical application classification, and the application cluster can be stored, such as in the data store of application classifications 232. A submitted query, such as the submitted query 202, can be received from the user device 106a. The features-application similarity engine 220, for example, can obtain a set of features of the submitted query and map the set of features to a corresponding hierarchical application classification. The application relevance engine 222 can determine that the corresponding hierarchical application classification has at least a specified level of similarity to the representative hierarchical application classification of the cluster. In response to determining that the corresponding hierarchical application classification has at least a specified level of similarity to the representative hierarchical application classification of the cluster, data responsive to the submitted query can be provided to the client device (e.g., user device 106). The data can be used for presenting, within the user interface 206, information about at least some of the applications in the application cluster.

Figure 4:
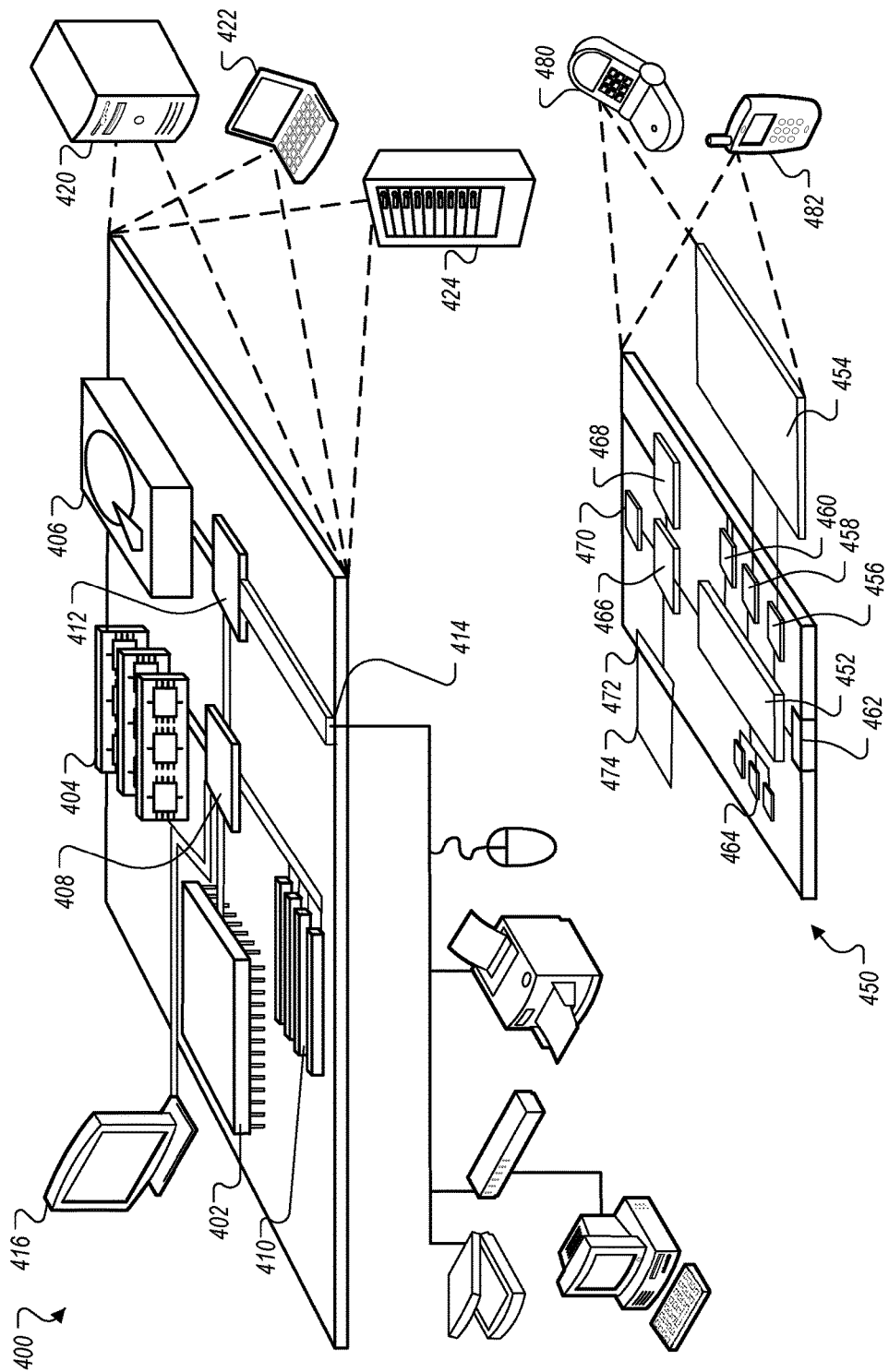
FIG. 4 is a block diagram of an example computer system that can be used to implement the methods, systems and processes described in this disclosure.

FIG. 4 is a block diagram of example computing devices 400, 450 that may be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers. Computing device 400 is further intended to represent any other typically non-mobile devices, such as televisions or other electronic devices with one or more processors embedded therein or attached thereto. Computing device 450 is intended to represent various forms of mobile devices, such as personal digital assistants, cellular telephones, smartphones, and other computing devices. The components shown here, their connections and relationships, and their functions, are meant to be examples only, and are not meant to limit implementations of the inventions described and/or claimed in this document.

Computing device 400 includes a processor 402, memory 404, a storage device 406, a high-speed controller 408 connecting to memory 404 and high-speed expansion ports 410, and a low-speed controller 412 connecting to low-speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high-speed controller 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a computer-readable medium. In one implementation, the memory 404 is a volatile memory unit or units. In another implementation, the memory 404 is a non-volatile memory unit or units.

The storage device 406 is capable of providing mass storage for the computing device 400. In one implementation, the storage device 406 is a computer-readable medium. In various different implementations, the storage device 406 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 404, the storage device 406, or memory on processor 402.

The high-speed controller 408 manages bandwidth-intensive operations for the computing device 400, while the low-speed controller 412 manages lower bandwidth-intensive operations. Such allocation of duties is an example only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed bus 414. The low-speed bus 414 (e.g., a low-speed expansion port), which may include various communication ports (e.g., USB, Bluetooth®, Ethernet, wireless Ethernet), may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as computing device 450. Each of such devices may contain one or more of computing devices 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The computing device 450 may also be provided with a storage device, such as a micro-drive or other device, to provide additional storage. Each of the components 450, 452, 464, 454, 466, and 468, are interconnected using various buses, and several of the components may be mounted on a common motherboard or in other manners as appropriate.

The processor 452 can process instructions for execution within the computing device 450, including instructions stored in the memory 464. The processor may also include separate analog and digital processors. The processor may provide, for example, for coordination of the other components of the computing device 450, such as control of user interfaces, applications run by computing device 450, and wireless communication by computing device 450.

Processor 452 may communicate with a user through control interface 458 and display interface 456 coupled to a display 454. The display 454 may be, for example, a TFT LCD display or an OLED display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of computing device 450 with other devices. External interface 462 may provide, for example, for wired communication (e.g., via a docking procedure) or for wireless communication (e.g., via Bluetooth® or other such technologies).

The memory 464 stores information within the computing device 450. In one implementation, the memory 464 is a computer-readable medium. In one implementation, the memory 464 is a volatile memory unit or units. In another implementation, the memory 464 is a non-volatile memory unit or units. Expansion memory 474 may also be provided and connected to computing device 450 through expansion interface 472, which may include, for example, a subscriber identification module (SIM) card interface. Such expansion memory 474 may provide extra storage space for computing device 450, or may also store applications or other information for computing device 450. Specifically, expansion memory 474 may include instructions to carry out or supplement the processes described above, and may include secure information also. Thus, for example, expansion memory 474 may be provide as a security module for computing device 450, and may be programmed with instructions that permit secure use of computing device 450. In addition, secure applications may be provided via the SIM cards, along with additional information, such as placing identifying information on the SIM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452.

Computing device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through transceiver 468 (e.g., a radio-frequency transceiver). In addition, short-range communication may occur, such as using a Bluetooth®, WiFi, or other such transceiver (not shown). In addition, GPS receiver module 470 may provide additional wireless data to computing device 450, which may be used as appropriate by applications running on computing device 450.

Computing device 450 may also communicate audibly using audio codec 460, which may receive spoken information from a user and convert it to usable digital information. Audio codec 460 may likewise generate audible sound for a user, such as through a speaker, e.g., in a handset of computing device 450. Such sound may include sound from voice telephone calls, may include recorded sound (e.g., voice messages, music files, etc.) and may also include sound generated by applications operating on computing device 450.

The computing device 450 may be implemented in a number of different forms, as shown in the figure. For example, it may be implemented as a cellular telephone 480. It may also be implemented as part of a smartphone 482, personal digital assistant, or other mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. Other programming paradigms can be used, e.g., functional programming, logical programming, or other programming. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A system comprising:
one or more processors; and
one or more memory elements including instructions that, when executed, cause the one or more processors to perform operations comprising:
accessing, by one or more servers and from a memory device, a stored query and a set of features of the stored query, wherein the set of features of the stored query specifies a main query topic and at least one query subtopic for the stored query;
accessing, by the one or more servers and from a memory device, a hierarchical application classification for a particular application, wherein the hierarchical application classification specifies at least a main application category and an application subcategory for the particular application;
determining, by the one or more servers, a level of similarity between the set of features of the stored query and the hierarchical application classification for the particular application;
determining, by the one or more servers, that the particular application is relevant to the stored query based on the level of similarity meeting a specified threshold;
indexing, by the one or servers, the stored query as a query that triggers presentation of information related to the particular application when the stored query is received from a client device;
receiving, from a client device, a submitted query;
obtaining, for the submitted query, a set of features of the submitted query that specifies at least a main topic and a subtopic of the submitted query;
identifying candidate applications having hierarchical application classifications that include the main topic and the subtopic; and
providing, to the client device responsive to the submitted query, data that present, within a user interface presented at the client device, information about at least one of the candidate applications.

2. The system of claim 1, the operations further comprising:
receiving, from a client device, a submitted query;
determining that the particular application is relevant to the submitted query; and
providing, to the client device responsive to the submitted query, data that present, within a user interface presented at the client device, information about the particular application.

3. The system of claim 2, wherein determining that the particular application is relevant to the submitted query comprises determining that the submitted query matches the stored query in the index.

4. The system of claim 1, the operations further comprising:
identifying, from among the identified candidate applications, a given application having a highest matching score relative to the submitted query, wherein providing data that present information about at least one of the candidate applications comprises providing data that present, within the user interface presented at the client device, information identifying the given application and an interactive user interface element that enables the given application to be downloaded from an application server.

5. The system of claim 1, the operations further comprising:
generating the set of features of the stored query, including:
identifying, for the stored query, a set of salient terms from search results that are obtained using the stored query;
parsing the stored query into a set of unigrams; and
identifying, as the set of features for the stored query, a set of topics corresponding to the stored query based on the set of salient terms and the unigrams.

6. A method, comprising:
accessing, by one or more servers and from a memory device, a stored query and a set of features of the stored query, wherein the set of features of the stored query specifies a main query topic and at least one query subtopic for the stored query;
accessing, by the one or more servers and from a memory device, a hierarchical application classification for a particular application, wherein the hierarchical application classification specifies at least a main application category and an application sub-category for the particular application;

determining, by the one or more servers, a level of similarity between the set of features of the stored query and the hierarchical application classification for the particular application;

determining, by the one or more servers, that the particular application is relevant to the stored query based on the level of similarity meeting a specified threshold;

indexing, by the one or servers, the stored query as a query that triggers presentation of information related to the particular application when the stored query is received from a client device:

receiving, from a client device, a submitted query;

obtaining, for the submitted query, a set of features of the submitted query that specifies at least a main topic and a subtopic of the submitted query;

identifying candidate applications having hierarchical application classifications that include the main topic and the subtopic; and providing, to the client device responsive to the submitted query, data that present, within a user interface presented at the client device, information about at least one of the candidate applications.

7. The method of claim 6, further comprising:
receiving, from a client device, a submitted query;
determining that the particular application is relevant to the submitted query; and
providing, to the client device responsive to the submitted query, data that present, within a user interface presented at the client device, information about the particular application.

8. The method of claim 7, wherein determining that the particular application is relevant to the submitted query comprises determining that the submitted query matches the stored query in the index.

9. The method of claim 6, further comprising:
identifying, from among the identified candidate applications, a given application having a highest matching score relative to the submitted query, wherein providing data that present information about at least one of the candidate applications comprises providing data that present, within the user interface presented at the client device, information identifying the given application and an interactive user interface element that enables the given application to be downloaded from an application server.

10. The method of claim 6, further comprising:
generating the set of features of the stored query, including:
identifying, for the stored query, a set of salient terms from search results that are obtained using the stored query;
parsing the stored query into a set of unigrams; and
identifying, as the set of features for the stored query, a set of topics corresponding to the stored query based on the set of salient terms and the unigrams.

11. A method, comprising:
accessing, by one or more servers and from a memory device, a stored query and a set of features of the stored query, wherein the set of features of the stored query specifies a main query topic and at least one query subtopic for the stored query;
accessing, by the one or more servers and from a memory device, a hierarchical application classification for a particular application, wherein the hierarchical application classification specifies at least a main application category and an application sub-category for the particular application;

determining, by the one or more servers, a level of similarity between the set of features of the stored query and the hierarchical application classification for the particular application;

determining, by the one or more servers, that the particular application is relevant to the stored query based on the level of similarity meeting a specified threshold;

indexing, by the one or servers, the stored query as a query that triggers presentation of information related to the particular application when the stored query is received from a client device;

clustering multiple different applications into an application cluster based on the hierarchical application classifications of the multiple different applications, wherein the application cluster has a representative hierarchical application classification;

receiving, from a client device, a submitted query;

obtaining a set of features of the submitted query;

mapping the set of features of the submitted query to a corresponding hierarchical application classification;

determining that the corresponding hierarchical application classification has at least a specified level of similarity to the representative hierarchical application classification of the cluster; and in response to the corresponding hierarchical application classification having at least a specified level of similarity to the representative hierarchical application classification of the cluster, providing, to the client device responsive to the submitted query, data that present, within a user interface presented at the client device, information about at least some of the applications in the application cluster.

12. A computer program product embodied in a non-transitive computer-readable medium including instructions, that when executed, cause one or more processors to perform operations comprising:
accessing, by one or more servers and from a memory device, a stored query and a set of features of the stored query, wherein the set of features of the stored query specifies a main query topic and at least one query subtopic for the stored query;
accessing, by the one or more servers and from a memory device, a hierarchical application classification for a particular application, wherein the hierarchical application classification specifies at least a main application category and an application sub-category for the particular application;

determining, by the one or more servers, a level of similarity between the set of features of the stored query and the hierarchical application classification for the particular application;

determining, by the one or more servers, that the particular application is relevant to the stored query based on the level of similarity meeting a specified threshold;

indexing, by the one or servers, the stored query as a query that triggers presentation of information related to the particular application when the stored query is received from a client device;

receiving, from a client device, a submitted query;

obtaining, for the submitted query, a set of features of the submitted query that specifies at least a main topic and a subtopic of the submitted query;

identifying candidate applications having hierarchical application classifications that include the main topic and the subtopic; and providing, to the client device responsive to the submitted query, data that present, within a user interface presented at the client device, information about at least one of the candidate applications.

13. The computer program product of claim 12, the operations further comprising:

receiving, from a client device, a submitted query;

determining that the particular application is relevant to the submitted query; and providing, to the client device responsive to the submitted query, data that present, within a user interface presented at the client device, information about the particular application.

14. The computer program product of claim 13, wherein determining that the particular application is relevant to the submitted query comprises determining that the submitted query matches the stored query in the index.

15. The computer program product of claim 12, the operations further comprising:

identifying, from among the identified candidate applications, a given application having a highest matching score relative to the submitted query, wherein providing data that present information about at least one of the candidate applications comprises providing data that present, within the user interface presented at the client device, information identifying the given application and an interactive user interface element that enables the given application to be downloaded from an application server.

16. The computer program product of claim 12, the operations further comprising:

generating the set of features of the stored query, including:

identifying, for the stored query, a set of salient terms from search results that are obtained using the stored query;

parsing the stored query into a set of unigrams; and identifying, as the set of features for the stored query, a set of topics corresponding to the stored query based on the set of salient terms and the unigrams.

17. A computer program product embodied in a non-transitive computer-readable medium including instructions, that when executed, cause one or more processors to perform operations comprising:

accessing, by one or more servers and from a memory device, a stored query and a set of features of the stored query, wherein the set of features of the stored query specifies a main query topic and at least one query subtopic for the stored query;

accessing, by the one or more servers and from a memory device, a hierarchical application classification for a particular application, wherein the hierarchical application classification specifies at least a main application category and an application sub-category for the particular application;

determining, by the one or more servers, a level of similarity between the set of features of the stored query and the hierarchical application classification for the particular application;

determining, by the one or more servers, that the particular application is relevant to the stored query based on the level of similarity meeting a specified threshold;

indexing, by the one or servers, the stored query as a query that triggers presentation of information related to the particular application when the stored query is received from a client device;

clustering multiple different applications into an application cluster based on the hierarchical application classifications of the multiple different applications, wherein the application cluster has a representative hierarchical application classification;

receiving, from a client device, a submitted query;

obtaining a set of features of the submitted query;

mapping the set of features of the submitted query to a corresponding hierarchical application classification;

determining that the corresponding hierarchical application classification has at least a specified level of similarity to the representative hierarchical application classification of the cluster; and in response to the corresponding hierarchical application classification having at least a specified level of similarity to the representative hierarchical application classification of the cluster, providing, to the client device responsive to the submitted query, data that present, within a user interface presented at the client device, information about at least some of the applications in the application cluster.

* * * * *

UNITED STATES PATENT AND TRADEMARK OFFICE
CERTIFICATE OF CORRECTION

PATENT NO. : 10,318,562 B2  
APPLICATION NO. : 15/221329  
DATED : June 11, 2019  
INVENTOR(S) : Boerschinger et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 331 days.

Signed and Sealed this  
Thirty-first Day of December, 2019

Andrei Iancu  
*Director of the United States Patent and Trademark Office*